(12) United States Patent
Tognazzini

(10) Patent No.: US 6,473,728 B1
(45) Date of Patent: Oct. 29, 2002

(54) ON-DEMAND, MULTI-LANGUAGE BUSINESS CARD PRINTER

(75) Inventor: Bruce Tognazzini, Woodside, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/652,034

(22) Filed: May 23, 1996

(51) Int. Cl.[7] .............................................. G06F 17/28
(52) U.S. Cl. .............................................. 704/3; 704/7
(58) Field of Search ........................ 704/1–7; 235/375; 400/88, 109, 100, 110

(56) References Cited

U.S. PATENT DOCUMENTS

| | | | | | |
|---|---|---|---|---|---|
| 4,072,246 A | * | 2/1978 | Paulin | ........................ | 221/307 |
| 4,595,980 A | * | 6/1986 | Innes | ............................ | 704/9 |
| 4,644,492 A | * | 2/1987 | Murata | ........................... | 704/3 |
| 4,755,877 A | * | 7/1988 | Vollert | ......................... | 358/285 |
| 4,757,329 A | * | 7/1988 | Sato et al. | ..................... | 400/88 |
| 4,915,027 A | * | 4/1990 | Ishibashi et al. | ............ | 400/110 |
| 5,073,054 A | * | 12/1991 | McDowell | ................... | 400/88 |
| 5,075,850 A | * | 12/1991 | Asahioka et al. | .............. | 704/2 |
| 5,149,211 A | * | 9/1992 | Pettigrew et al. | ............. | 400/88 |
| 5,239,621 A | * | 8/1993 | Brown, III et al. | ......... | 395/115 |
| 5,268,839 A | * | 12/1993 | Kaji | .............................. | 704/3 |
| 5,337,258 A | * | 8/1994 | Dennis | ................... | 364/551.01 |
| 5,349,368 A | * | 9/1994 | Takeda et al. | ................. | 704/3 |
| 5,351,189 A | * | 9/1994 | Doi et al. | ....................... | 704/2 |
| 5,402,528 A | * | 3/1995 | Christopher et al. | ........ | 395/109 |
| 5,434,776 A | * | 7/1995 | Takagi | ............................ | 704/9 |
| 5,442,782 A | * | 8/1995 | Malatesta et al. | .............. | 704/9 |
| 5,517,409 A | * | 5/1996 | Ozawa et al. | ................... | 704/3 |
| 5,548,509 A | * | 8/1996 | Takagi | ............................ | 704/9 |
| 5,659,765 A | * | 8/1997 | Nii | ................................ | 704/3 |
| 5,701,497 A | * | 12/1997 | Yamauchi et al. | ............. | 704/2 |
| 5,790,766 A | * | 8/1998 | Sakamoto et al. | .......... | 395/113 |
| 5,818,442 A | * | 10/1998 | Adamson | ....................... | 704/8 |
| 5,854,997 A | * | 12/1998 | Sukeda et al. | ................. | 704/3 |

\* cited by examiner

*Primary Examiner*—Patrick N. Edouard
(74) *Attorney, Agent, or Firm*—McDermott, Will & Emery (57) ABSTRACT

A computer driven hand held business card printer contains in memory a plurality of different language versions in which the card is printed is selectable, prior to printing. A plurality of different types of cards each with plural language versions may be accommodated. Card content in the various languages is downloadable from a PC into the business card printer using an infrared communications link.

9 Claims, 13 Drawing Sheets

ON-DEMAND, MULTI-LANGUAGE BUSINESS CARD PRINTER

BACKGROUND OF THE INVENTION

1. Field of the Invention

The invention relates to computer driven printers and more particularly to a hand held multi-language business card printer for printing business cards on demand.

2. Description of Related Art

The practice of business travelers to have their business cards printed on two sides is known. On one side, business identification information is printed in the native language of the owner of the card. On the reverse side, the same information or equivalent is printed in a foreign language. Even with advance planning, such as when having English and Japanese cards pre-printed prior to a trip to Japan, occasions arise in which one encounters an individual from a country for which a pre-printed language is not available. Other times, occurrences arise in which travel itineraries change, placing one in a country unexpectedly.

The Problems

The two-sided printing of the prior art does not solve the problem of having business cards in a correct language for a variety of languages. It also fails to address the situation where a traveler fails to recognize the need for a card at all in advance of an actual encounter. Also, the prior art does not address the situation in which an international traveler meets with individuals from a variety of countries at international conventions.

SUMMARY OF THE INVENTION

The present invention provides apparatus, systems, processes and computer program products which enable on-demand, multi-language business card printing.

When a native language version of a business card is prepared, it can be sent off to a translation service where an appropriate number of translations of the native language card can be prepared in respective foreign languages. These can be returned to the client of the translation service for incorporation in a business card printer.

The on-demand, multi-language business card printer is a portable hand held device which can be loaded with a plurality of language versions of different card types. One card type might be social. One might be business and another an outside business such as a consulting operation. A native language version of each card type can be prepared and corresponding translations of the native language version can be provided and stored in the on-demand, portable multi-language business card printer. Once loaded in the printer, an appropriate language selection can be made for each of the corresponding card types and the proper text will be printed in the language selected on the reverse side of a business card.

The invention also provides for double-sided card printing where the text in one language is on one side and a text in a different language is on another side.

Different versions of the invention permit somewhat different functionality. In one, the card is fed in one end of the device and ejected from the other end after printing. In a second, a stock of cards is contained within the printer housing and selectively printed as requested.

In one embodiment, languages and card types are selected by respective sliders and the language applied to the business card is the language selected. In another embodiment, a touch screen is utilized for determining the language. In yet another, global positioning satellite system information is utilized to identify the user's location and, combined with a language map, identifies the language appropriate for that location. In the latter embodiment, of course, an override may be provided for the situation when one meets a Russian speaking person in Japan.

The invention is directed to a hand held (e.g. portable) printing apparatus for printing selectable different types of content, such as a business card, a social card or an identification in selectable languages, including a paper path joining an input port, into which a print medium can be inserted and an output port from which it emerges after printing. A print head, situated along the paper path prints content on a print medium as it traverses the paper path from input port to output port. A language selector specifies the language in which the content is printed. Language selection occurs using a computer which controls selection and printing of particular content. The computer includes memory storing one or more language versions of one or more sets of content. In one form, the printing apparatus includes a magazine containing one or more instances of print medium, such as a plurality of business cards, for sequential printing. Selection of languages for use in printing content can be done using a touch screen display linked to a map relating location and corresponding language. It can alternately be done by using a positioning satellite receiver linked to a map relating location and corresponding language. The computer of the portable printing device is linked to another computer, such as a personal computer, for downloading content to be printed. The link is preferable an infrared communications link.

The invention is also directed to a method of printing content in one of a plurality of languages, including the steps of: storing a plurality of foreign language versions of a particular type of content; selecting one of the foreign language versions of the type of content; and printing the one of the foreign language versions using a portable printer.

The invention is also directed to a method of printing different language versions of the same content on a print medium, including selecting one language version of the content for printing on one side of the medium, selecting a different language version of the content for printing on the other side of the medium; and providing an element for performing the step of printing the version on respective sides of the medium. Selecting can be accomplished by automatically determining the location at which the step of printing will occur and selecting at least one language version based on the location. Alternatively, selecting can be performed by touching a location on a map which corresponds to a country in which the language spoken is the desired language version.

The invention is also directed to a method of loading multiple language versions of particular content into a portable printer, by preparing an example of the content in a first language; sending the example to a translation service for translation into at least one other language; and receiving from the translation service at least one translation of the example and storing it in a portable printer over a communications link, such as an infrared link.

The invention is also directed to a system for loading information into a portable printer for printing including a network; a plurality of computers connected to the network, at least one of which can be connected to the portable printer over a communications link and at least another of is controlled by a translation service; the at least one computers connected to the network including a communications interface for sending the information in one language to the translation service over the network and receiving translated versions of the information back from the translation service; and a communications link between the at least one computer and the portable printer for sending at least one of the translated versions to the portable printer.

The invention is also directed to a computer program product including a memory medium; and a computer program stored on the memory medium, the computer program including instructions for transferring plural language versions of content into memory of a portable printing device. The invention is also directed to a computer program product including a memory medium; and a computer program stored on the memory medium, the computer program including instructions for allowing selection and printing one or more stored plural language versions of content onto a print medium.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
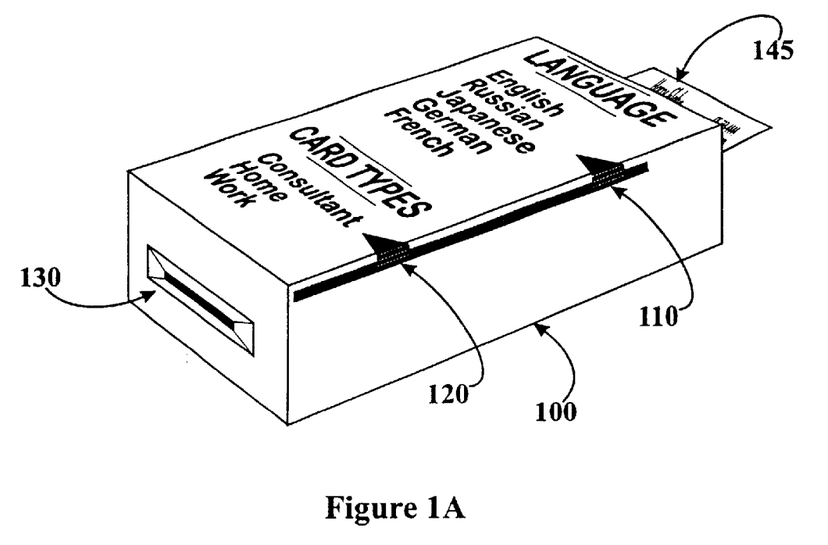
FIG. 1A is a perspective view of one exemplary embodiment of a multi-language business card printer in accordance with the invention.

FIG. 1A shows a perspective view of one exemplary embodiment of an on-demand multi-language business card printer in accordance with the invention. An upper surface, in the illustration shown, is partitioned into a language section and card type section. The language section contains partitions for a number of different languages, English, Russian, Japanese, German and French being shown. The particular language to be printed is selected by slider 110 of the printer 100. A slider 120 selects which of several possible card types are to be reproduced. Each card type has a native language master which serves as the basis for obtaining translations into other languages for printing. One might desire separate card types, that is, cards having different content, for business, social, outside business and for alternative identity purposes. By selecting the card type, the particular content is specified; whereas by specifying the language, the foreign language equivalent to the native language content selected by the card type is selected for printing on the card.

Figure 1B:
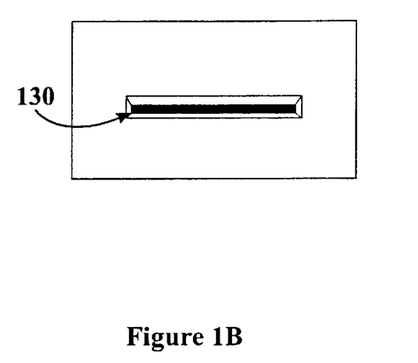
FIG. 1B is a left end view of the printer of FIG. 1.

FIG. 1B shows a left end view of the printer shown in FIG. 1A.

Figure 1C:
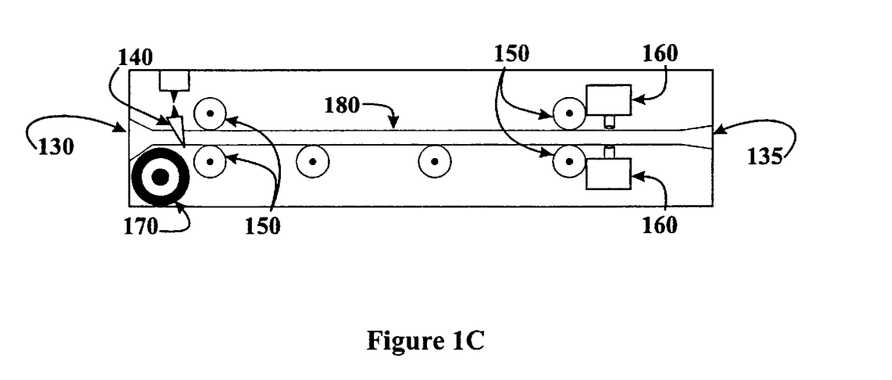
FIG. 1C is a cross-sectional view of the printer of FIG. 1 showing the card path.

FIG. 1C shows a cross-sectional view of the printer as shown in FIG. 1A.

Referring to FIG. 1A, a card is inserted in slot 130 for printing. As shown in FIG. 1C, the presence of the card in entry slot 130 displaces contacts of a microswitch 140 which is utilized to initiate power up and to activate the printing device for printing. Power is supplied, for example, by battery 170 in response to closing of the microswitch contacts. Opposing rollers 150 are actively driven by a small motor to capture the card between the wheels and to cause the card to be transported along the card path in the direction shown by arrow 180 until the card is presented between print heads 160 where the actual printing is applied to the surface of the card. When printing of the card is completed, card 145 emerges from slot 135 for removal by the user. The print heads 160 can be provided so that both sides of blank card stock may be printed in respectively selected languages, as shown, or optionally only one print head may be used. It is also possible to utilize an embodiment with a single print head and still print both sides of the card by flipping the card over and reloading it after an initial language has been printed. In the case of two printer heads, two sliders 110, are required to select the two languages for the top and bottom printing of the business card.

Figure 2:
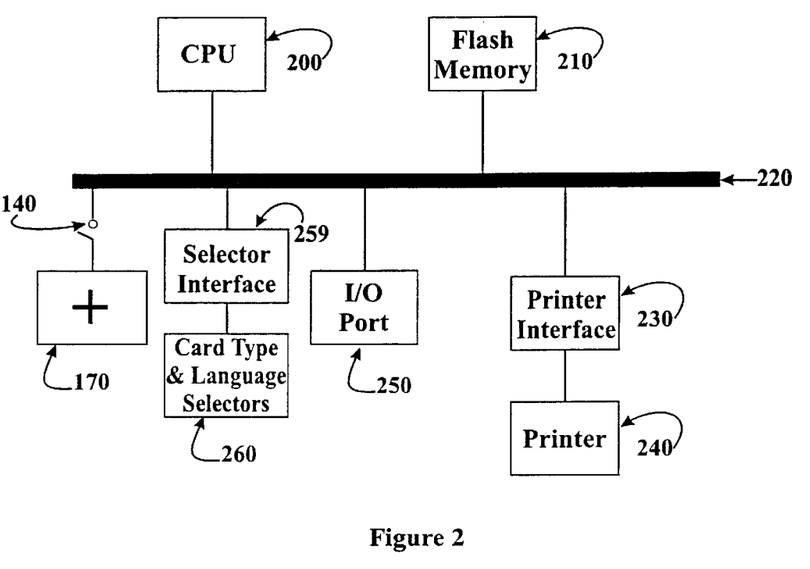
FIG. 2 is a block diagram of an exemplary computer architecture used with a multi-language business card printer.

FIG. 2 is a block diagram of an exemplary computer architecture used with the multi-language business card printer of the invention. CPU 200 and flash memory 210 are linked over a computer bus 220. Power is supplied to the bus from power source (e.g. battery) 170 initially via microswitch 140 or through a latching power-on switch which is activated by microswitch 140 and which maintains power applied to the device for a full printing cycle. The print heads illustrated at 240 are interfaced to the computer bus via printer interface 230. An I/O port, 250, is utilized to load information to and from flash memory 210 for use during the printing operations. Card type and language selector 260 are connected to bus 220 over selector interface 259.

Figure 3:
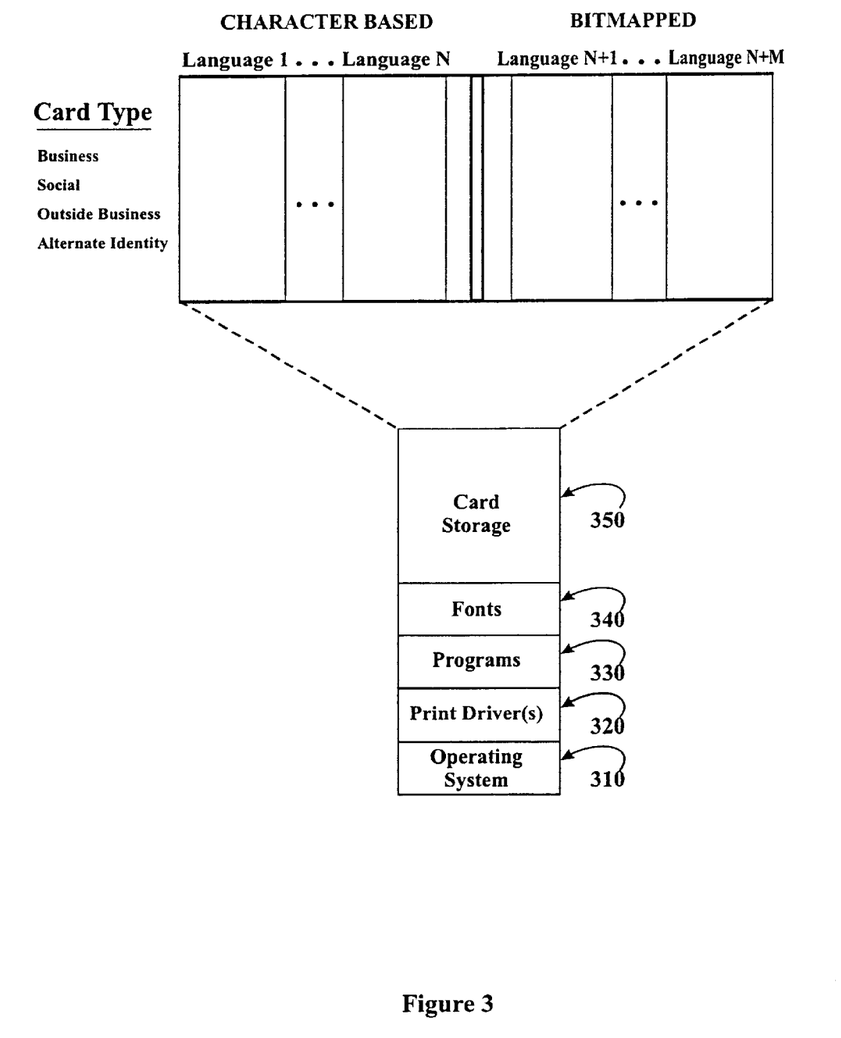
FIG. 3 is a diagram showing an exemplary memory architecture of the invention.

FIG. 3 is a diagram showing an exemplary memory architecture of the invention. An operating system is shown at 310 which implements primitives utilized for performing elementary computer functions. With respect to the printer 240 shown in FIG. 2, a print driver 320 may control a printer either via operating system services 310 or via direct control, bypassing the operating system. Programs 330 are described more hereinafter and control the loading of information into the multi-language business card printer. A variety of fonts, 340, are available for use by the programs or the print drivers to form characters representing the business card information to be printed on the card by the printer. Card storage 350 is shown more in detail in the expanded version above the block. A variety of card types are shown. The language 1 version and/or language N+1 version of each card type will contain the native language version of the card content in either a character set, such as ASCII, or as a bit mapped representation. For certain languages, the bit mapped representation may be the only reasonable one to implement. For others, it may be preferred to utilize an international version of ASCII and then let the font set be appropriate for the characters needed by the respective languages.

It may be desirable to store in separate regions of memory the locally generated card content from externally supplied card content received from a translation service as shown above.

Figure 4:
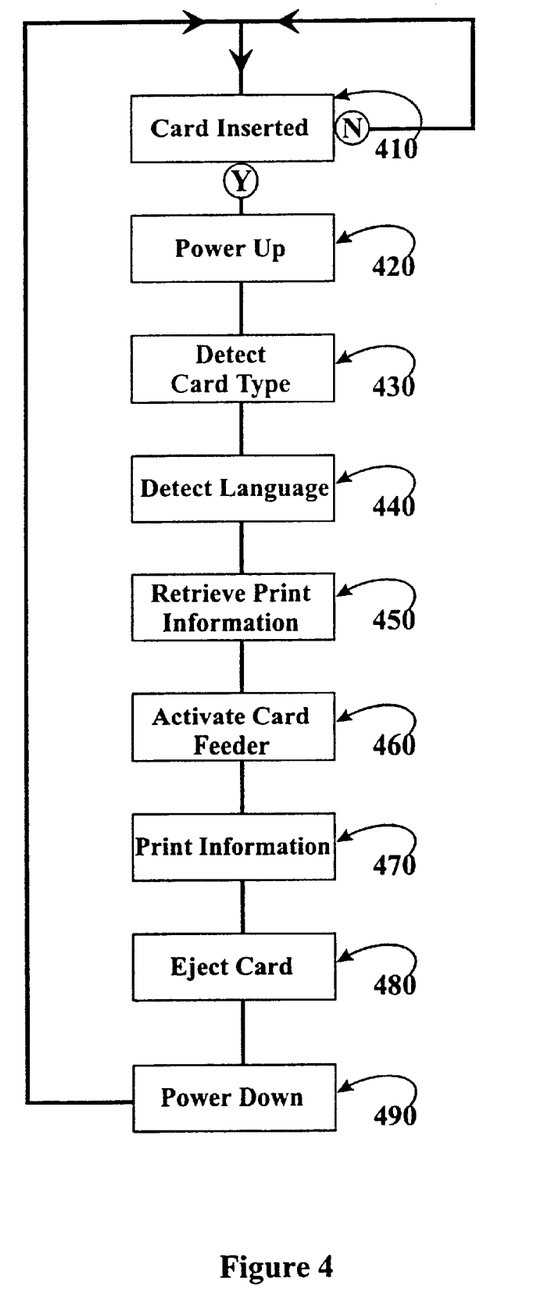
FIG. 4 is a flow chart of a computer process used for the multi-language business card printer.

FIG. 4 illustrates a flow chart of the process utilized to print a card. At step 410, a determination is made whether or not a card has been inserted. This is best done by sensing whether or not contacts 140 have been closed. If a card is not inserted, the system remains in a quiescent state awaiting insertion of the card. If a card insertion is detected (410Y) power-up (420) is initiated and latched for the duration of the print operation. The card type is detected (430), for example, by detecting the location of slider 120 of FIG. 1A. Similarly, the language version or versions to be printed are detected (440). Appropriate information is retrieved (450) from the memory in order to have the information needed to print the selected card type in the languages specified. Once the information is available, the card path feeder is activated (460) and the information is printed by the print heads on the business cards (470), the card is ejected (480) and the system powers down at 490.

Figure 5A:
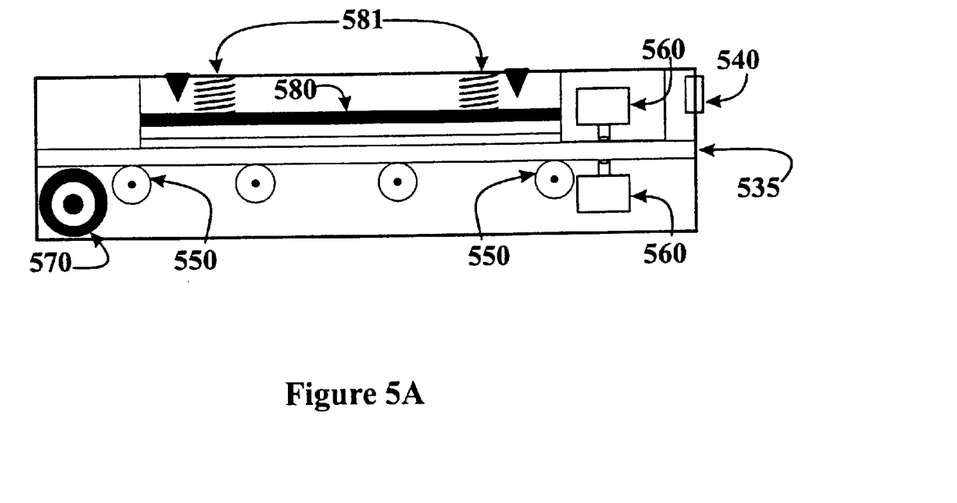
FIGS. 5A–5D show cross-sectional, left end, right end and open views of a second embodiment of the invention, respectively.
Figure 5B:
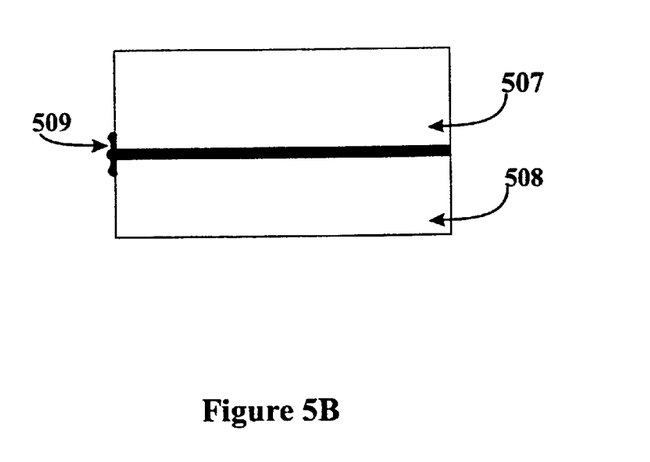
Figure 5C:
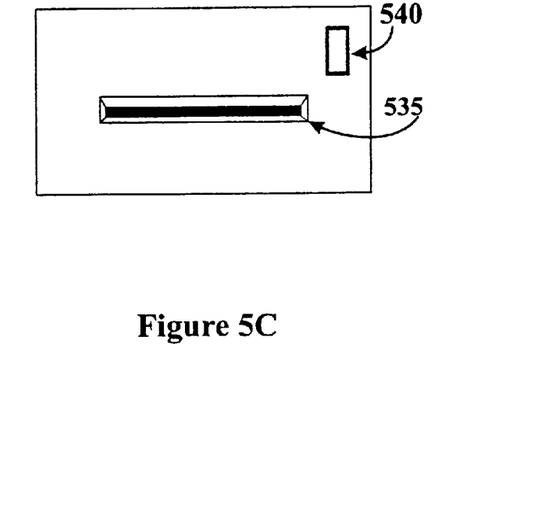
Figure 5D:
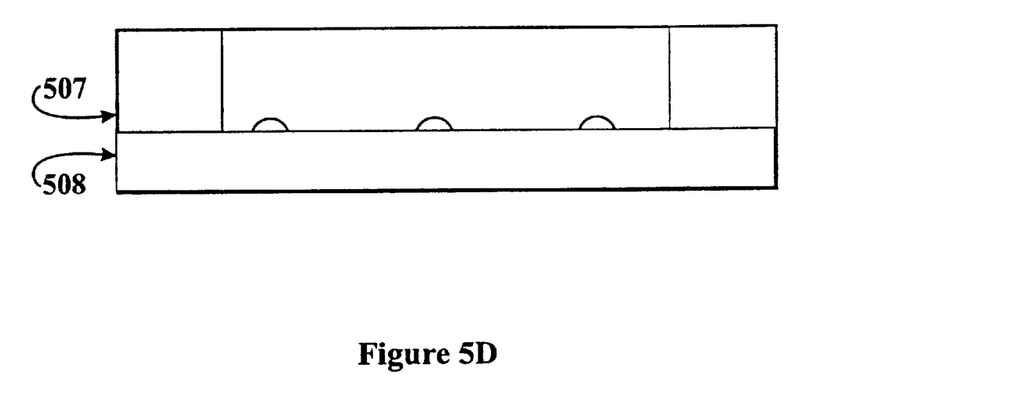

FIGS. 5A–5D show a cross-sectional, a left end, a right end and an open view of a second embodiment of the invention, respectively. Items 550, 560, 570 and 535 correspond to the items ending in the same last two digits shown in FIG. 1C. This embodiment differs from that shown in FIG. 1C in that there is no input slot 130 for receiving a business card. Instead, a magazine of business cards is loaded in the device. As illustrated in FIG. 5A and biased against rollers 550 with springs 581 and plate 580. As shown in FIG. 5B, top and bottom portions of the printer (507 and 508) are hinged (509) to permit the printer to be opened as shown in FIG. 5D. This permits the loading of blank business card stock (582) into the printer or, alternatively, a business card stock which has been preprinted with the user's native language. Selection of card type and language corresponds to that disclosed in conjunction with FIGS. 1A–1C.

Since there is no input slot 130, activation of the printing process occurs by way of microswitch 540 shown in FIGS. 5A and 5C. With language and card type selected, or selected as discussed more hereinafter, the printing of the card may be initiated by pushing microswitch 540.

The embodiment of FIGS. 5A–5D the invention permits the printer itself to serve as a card carrier for business cards.

Figure 6:
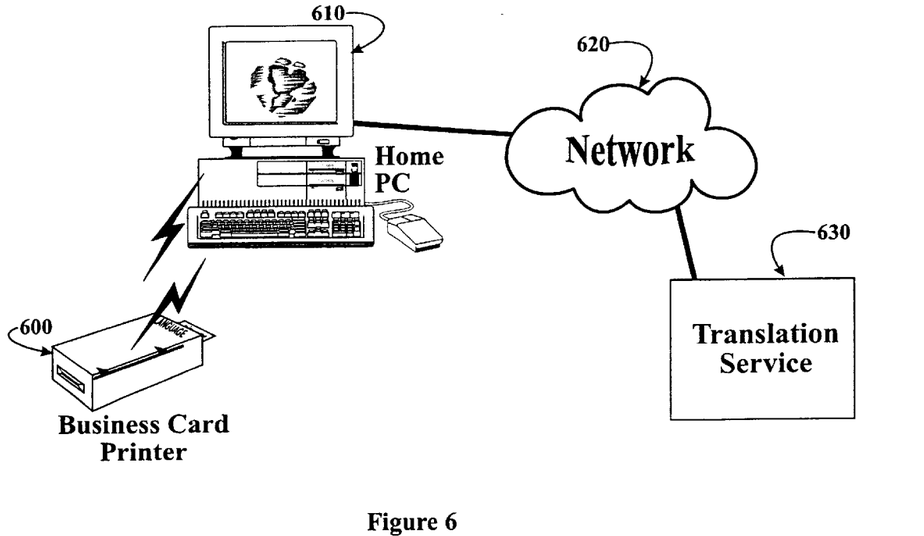
FIG. 6 illustrates the acquisition of card translation information and loading of that information into the multi-language business card printer.

FIG. 6 illustrates the acquisition of card translation information and loading of that information into the multi-language business card printer. Preferably, the business card printer 600 is used in conjunction with a user's personal computer 610. The user can create content for a business card printer, using standard text or graphics software. Loading into the business card printer 600 occurs by loading contents and fonts information, or by downloading a bit map implementing that information for storage in the memory of the business card printer. The link between the business card printer and the PC could be an RS232 port or preferably an infra-red link. Once a native language version of a card has been defined by the user, the user may wish to obtain translations of that card into the appropriate languages. This can be accomplished by connecting the user's PC over a network 620 to a translation service 630 where the request for translation could be submitted. After translation is completed, the translated information can be returned over the network 620 to the user's personal computer 610 for loading in the business card printer 600. By maintaining an inventory of translations of a particular card type in the personal computer 610, the user has the option of downloading selective languages of a particular card type into the business card printer 600. It is clear that a particular translation must be linked to the native language version of a particular card type so that a wrong translation will not be associated with the desired business card information.

Figure 7:
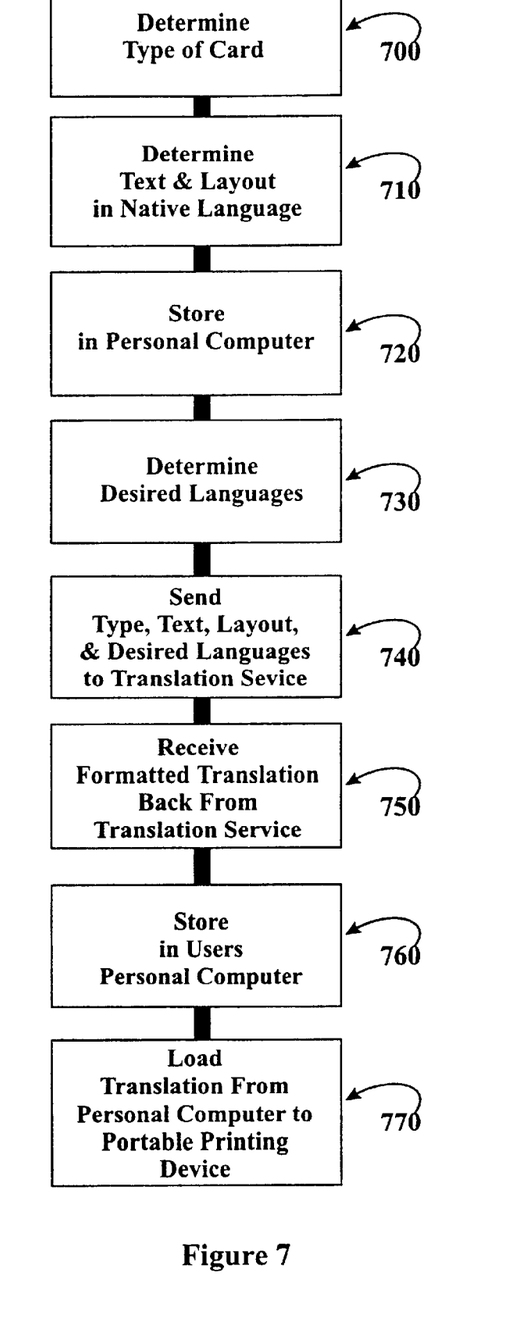
FIG. 7 is a flow chart of a computer process used to acquire and load card printing information.

The process just described is set forth more in detail in the flow chart shown in FIG. 7. A user designs a card by determining the type of card and the text and layout of the card in a native language (700, 710). It is stored in the user's personal computer 720. A determination is made of the desired languages for the particular card type and the card type, text, layout and desired languages are sent to a translation service (730, 740). Once the translation is completed, the formatted translations are received back from the translation service and stored in the user's personal computer (750, 760). The appropriate translations are then loaded from the personal computer into user's multi-language business card printing device and stored in the proper memory location for the language and card type.

Figure 8A:
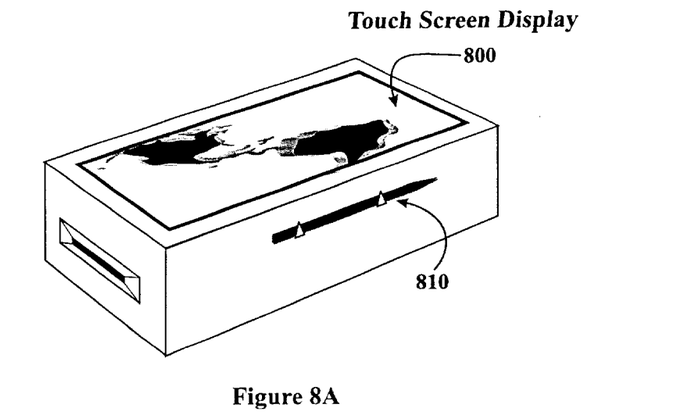
FIGS. 8A and 8B illustrates another embodiment of the invention using a touch screen display.
Figure 8B:
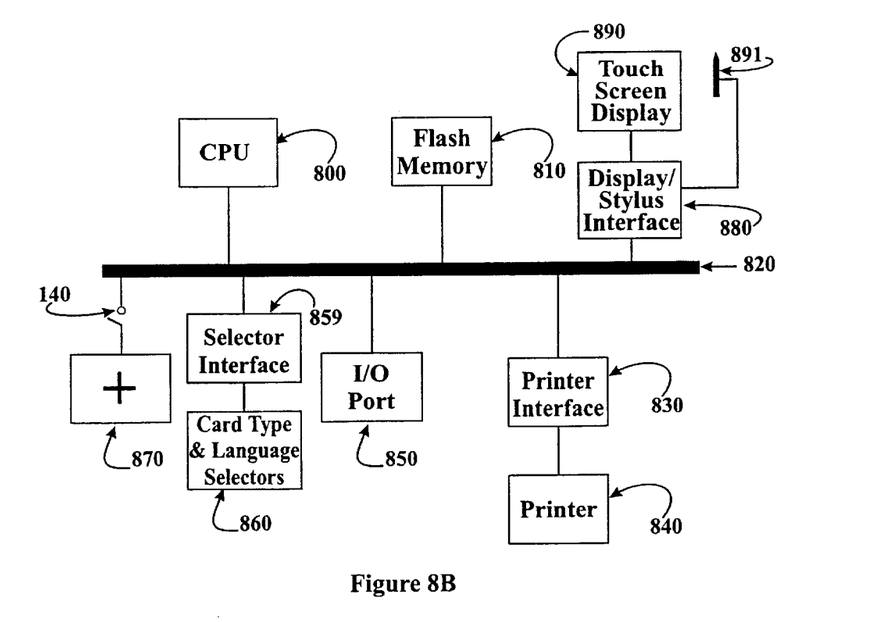

FIGS. 8A and 8B illustrate another embodiment of the invention using a touch screen display. In one form, a geographical representation of a location, such as a map of the world, is displayed on a touch screen display 800. The touch screen display, containing the geographical representation can be touched, for example, using stylus 810, to indicate a particular location in the world. The flash memory, discussed earlier, can be expanded to contain a bit map of the world and various country subspaces. By touching a particular location on the map, the subspace associated with a particular country and with its appropriate language is detected. Since the country is known, and its native language is known, the language appropriate for the location indicated with the stylus 810 can be selected for printing. Where many countries share a language, such as in South America, it may be desirable to have merely a language map of the world instead of a geographical division. Where a country has more than one language, the country may be divided into language regions.

FIG. 8B is a block diagram of the computer architecture utilized with a touch screen display. Items 800, 810, 820, 830, 840, 850, 870 and 140 correspond to the elements ending in the same last two digits shown in FIG. 2. A touch screen display interface 880 interfaces with touch screen display 890 and touch control stylus 891 to provide the touch screen selection.

In an alternative form, a list of languages may be displayed for selection using the touch screen and the stylus. Alternatively, a list of languages could be selected using a cursor under the control of up down buttons accessible on the surface of the multi-language business card printing device.

Figure 9:
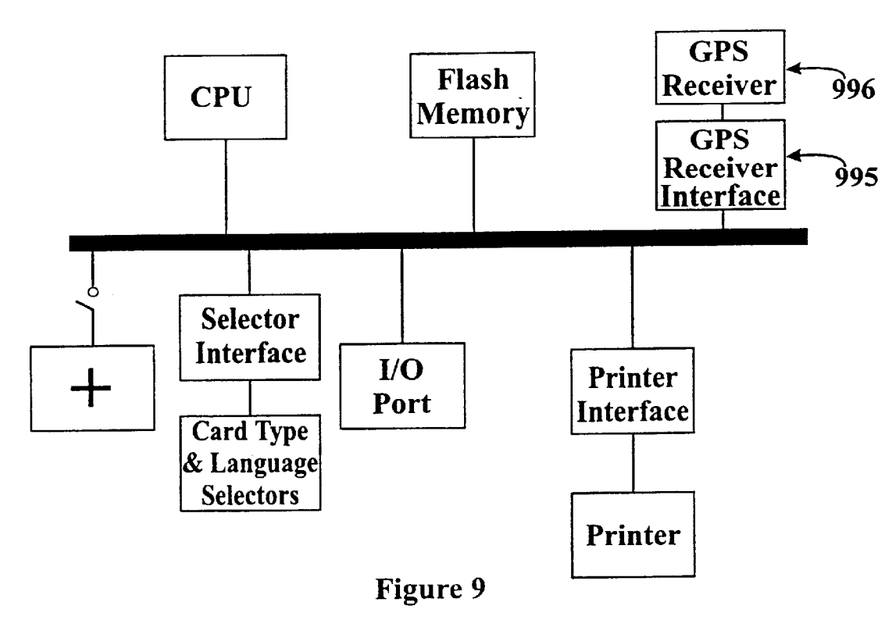
FIG. 9 illustrates another embodiment of the invention in which GPS information is used to select languages automatically.

FIG. 9 illustrates another form of the invention in which a GPS (Global Positioning Satellite System) receiver is utilized to determine location of the business card printer in order to select the language appropriate for the country in which the business card printer is located. With a GPS receiver, it would not be necessary to utilize a stylus or touchscreen to identify a country or a location in order to determine the appropriate language in which to print the business card since the location would be known from the GPS receiver. The current location identified by the GPS receiver is compared with an internal map representation, a representation of either geographic or language boundaries, which would then automatically result in the selection of the appropriate language for the locale in which the printing device is situated. Of course, one may desire to permit an override in the event that two persons foreign to the location meet in the location and the two languages native to the respective persons are different from that utilized in the location.

FIG. 9 is substantially identical to FIG. 8B with the exception that the touch screen display and interface is replaced with a GPS receiver and a receiver interface. Rather than replacing the touch screen display, the GPS receiver could supplement it to permit the touch screen display to be utilized for the selection of languages in an override mode.

Figure 10A:
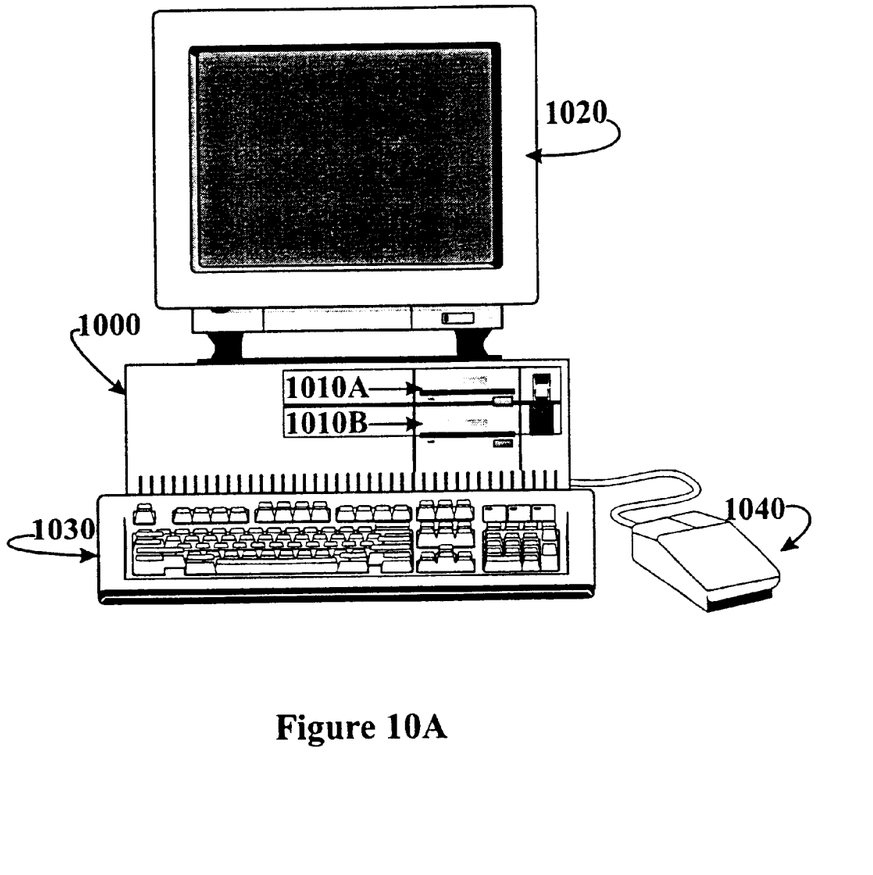
FIG. 10A illustrates a computer of a type suitable for carrying out the invention.

FIG. 10A illustrates a computer of a type suitable for use is the PC in accordance with the invention. Viewed externally in FIG. 10A, a computer system has a central processing unit 1000 having disk drives 1010A and 1010B. Disk drive indications 1010A and 1010B are merely symbolic of a number of disk drives which might be accommodated by the computer system. Typically, these would include a floppy disk drive such as 1010A, a hard disk drive (not shown externally) and a CD ROM drive indicated by slot 1010B. The number and type of drives varies, typically, with different computer configurations. The computer has the display 1020 upon which information is displayed. A keyboard 1030 and a mouse 1040 are typically also available as input devices over interface 1045. Preferably, the computer illustrated in FIG. 10A is a SPARC workstation from Sun Microsystems, Inc.

Figure 10B:
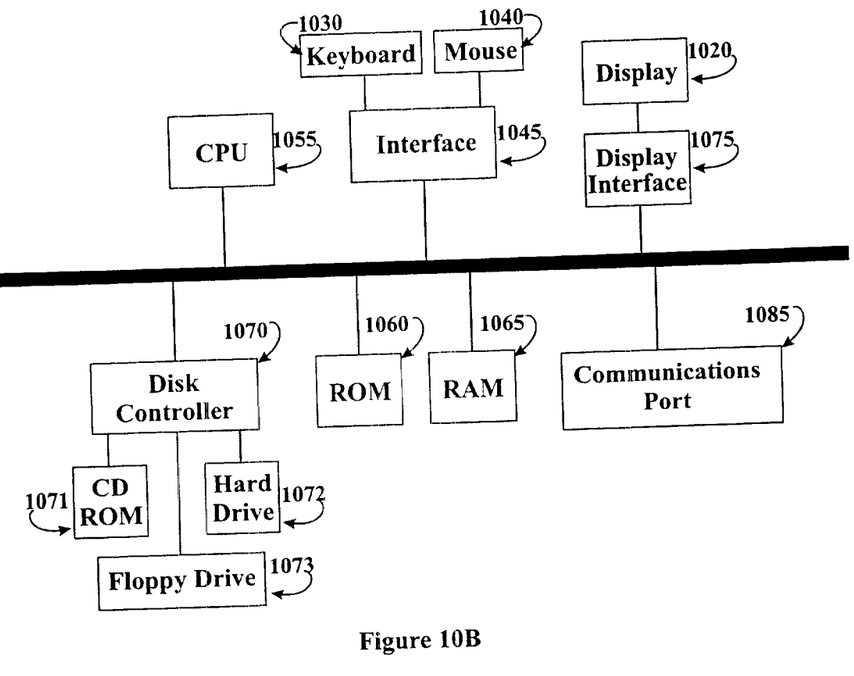
FIG. 10B illustrates a block diagram of the computer of FIG. 10A.

FIG. 10B illustrates a block diagram of the internal hardware of the computer of FIG. 10A. A bus 1050 serves as the main information highway interconnecting the other components of the computer. CPU 1055 is the central processing unit of the system, performing calculations and logic operations required to execute a program. Read only memory (1060) and random access memory (1065) constitute the main memory of the computer. Disk controller 1070 interfaces one or more disk drives to the system bus 1050. These disk drives may be floppy disk drives, such as 1073, internal or external hard drives, such as 1072, or CD ROM or DVD (Digital Video Disks) drives such as 1071. A display interface 1075 interfaces display 1020 and permits information from the bus to be displayed on the display. Communications with external devices can occur over communications port 1085.

Figure 10C:
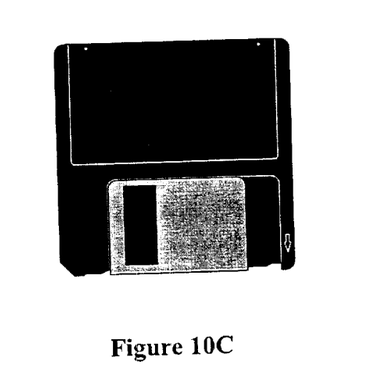
FIG. 10C illustrates a floppy disk containing a program usable with the computer of FIG. 10A.

FIG. 10C illustrates an exemplary memory medium which can be used with drives such as 1073 in FIG. 10B or 1010A in FIG. 10A. Typically, memory media such as a floppy disk, or a CD ROM, or a Digital Video Disk will contain, inter alia, a multi-byte locale for a single byte language and the program information for controlling the computer to enable the computer to perform its testing and development functions in accordance with the invention.

Using the techniques disclosed herein, a supply of correctly printed business cards can always be available to an international business traveler, thus overcoming the problems of the prior art.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A hand held printing apparatus for printing content in selectable languages, comprising:
   a. a paper path joining an input port and an output port;
   b. at least one print head, situated along the paper path for printing content on a print medium as it traverses the paper path from input port to output port;
   c. a storage medium containing a version of the content to be printed in an original language and plural different language versions of substantially the same content as the original language version of the content to be printed; and
   d. a language selector for specifying the language of the version of the content to be printed, stored in the storage medium, that is to be printed.

2. Apparatus of claim 1 further including a content selector for selecting a set of content for printing from among different sets of content.

3. Apparatus of claim 1 further comprising:
   a computer comprising a computer processor and memory;
   a selector interface for indicating the language specified with the selector to said computer;
   a printer interface connecting said computer to said print head;
   whereby said computer controls said print head in accordance with the language specified by the selector to print the language version of the content to be printed that corresponds to the specified language.

4. Apparatus of claim 1 further comprising a magazine containing one or more instances of print medium for sequential printing on by said print head.

5. Apparatus of claim 3 in which said selection mechanism includes a touch screen display.

6. Apparatus of claim 3 in which said selector comprises a touch screen display linked to a map relating at least one location and corresponding language for said location.

7. Apparatus of claim 3 in which said selection mechanism includes a global positioning satellite receiver linked to a map relating location and corresponding language for said location.

8. Apparatus of claim 1 further comprising a communications link from one computer controlling said printing apparatus to a different computer for downloading content from said different computer to said computer for printing.

9. Apparatus of claim 8 in which said communications link is an infrared communications link.

* * * * *